United States Patent [19]

Salesse

[11] Patent Number: 5,033,995
[45] Date of Patent: Jul. 23, 1991

[54] MOTION TRANSFORMING DEVICE, AND IN PARTICULAR A SPEED REDUCTION GEAR

[76] Inventor: Christian Salesse, 30, rue Jules Auffret, F 93330 Neuilly Sur Marne, France

[21] Appl. No.: 448,971

[22] Filed: Dec. 12, 1989

Related U.S. Application Data

[62] Division of Ser. No. 121,231, Nov. 16, 1987, Pat. No. 4,896,566.

[30] Foreign Application Priority Data

| Nov. 24, 1986 | [FR] | France | 86 16328 |
| Jan. 23, 1987 | [FR] | France | 87 00792 |
| Mar. 16, 1987 | [FR] | France | 87 03574 |
| Apr. 10, 1987 | [FR] | France | 87 05155 |

[51] Int. Cl.$^5$ .................. F16H 59/36; F16H 15/00
[52] U.S. Cl. ....................................... 475/182; 74/203
[58] Field of Search .............. 475/182, 166, 167, 171; 74/203

[56] References Cited

U.S. PATENT DOCUMENTS

| 1,072,834 | 9/1913 | Devlin | 475/182 |
| 1,091,487 | 3/1914 | Devlin | 475/182 |
| 2,268,305 | 12/1940 | Reinhard | 475/182 |
| 2,559,299 | 7/1951 | Helling | 475/182 |
| 2,571,427 | 10/1951 | Drachman | 74/89.22 |
| 2,653,490 | 9/1953 | Testori | 475/182 |
| 2,859,629 | 11/1911 | Parker et al. | 74/89.22 |
| 3,115,794 | 12/1963 | Morin | 475/182 |
| 3,115,795 | 12/1963 | Morin | 475/182 |
| 3,744,592 | 7/1973 | Neuman | 475/182 |
| 4,044,633 | 8/1977 | Lee | 475/182 |
| 4,048,871 | 9/1977 | Fyock | 475/182 |
| 4,321,842 | 3/1982 | Stromoitch | 475/182 |
| 4,567,789 | 2/1986 | Wilkes | 475/182 |

FOREIGN PATENT DOCUMENTS

| 2513004 | 9/1976 | Fed. Rep. of Germany | 475/182 |
| 0001847 | 1/1984 | Japan | 475/182 |
| 0632300 | 11/1949 | United Kingdom | 475/182 |
| 2004346 | 3/1979 | United Kingdom | 475/182 |

*Primary Examiner*—Leslie A. Braun
*Assistant Examiner*—Winnie Yip
*Attorney, Agent, or Firm*—Dennison, Meserole, Pollack & Scheiner

[57] ABSTRACT

A device for transforming motion, and in particular a speed reduction gear, comprises a first stage comprising two moving members (50, 60) at least one of which is functionally coupled to a shaft (74) generating a rotary motion; a second stage comprising at least one set of two pulleys (54, 54) constrained to rotate together, and co-operating with respective transmission means, for example two endless drive strands (52, 64) which co-operate with the moving members of the first stage; and a moving support (26) which supports the two pulleys of the second stage to rotate freely and which is displaced over an imposed trajectory, thereby generating a second motion, with the first motion being a high speed motion and the second motion being a slow motion.

1 Claim, 4 Drawing Sheets

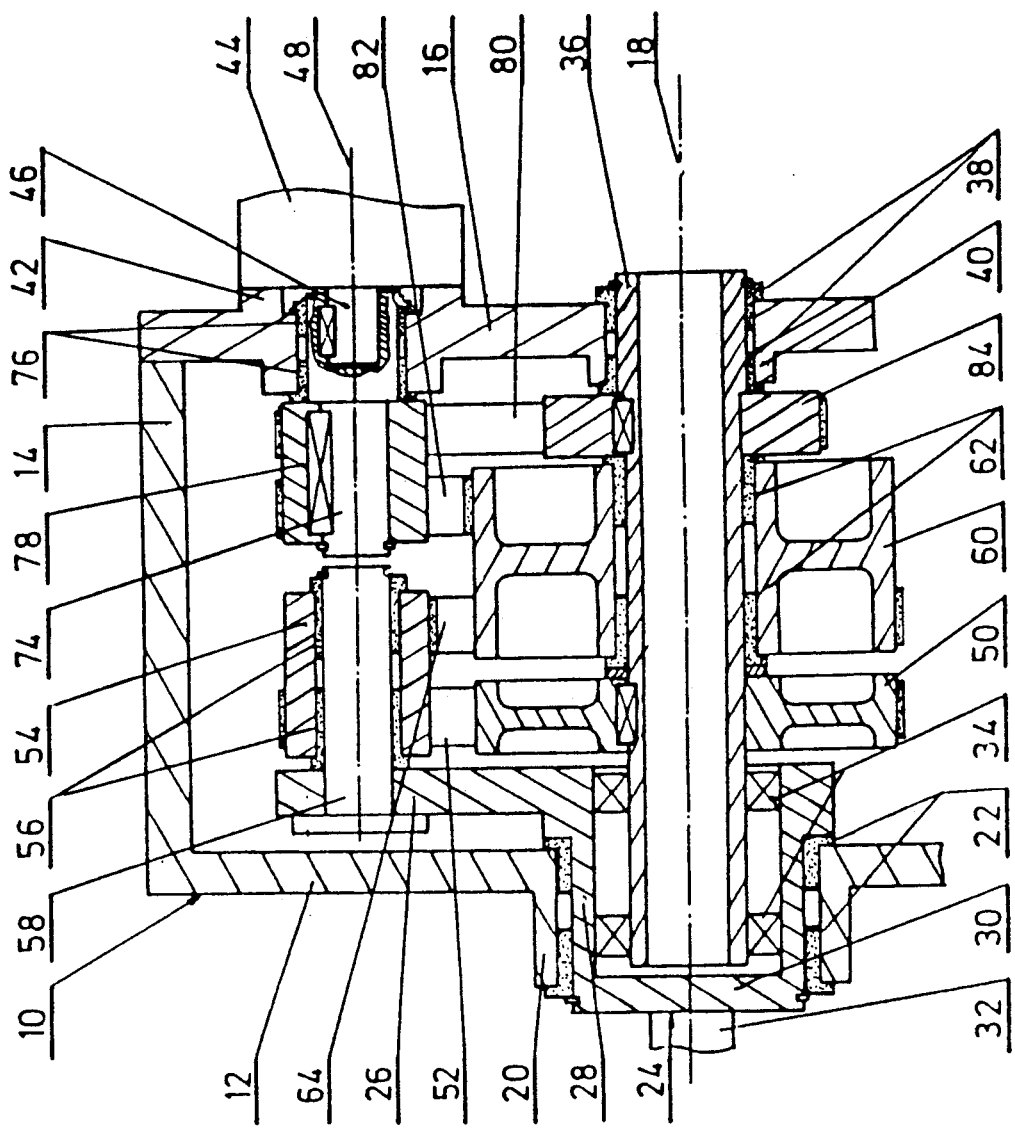
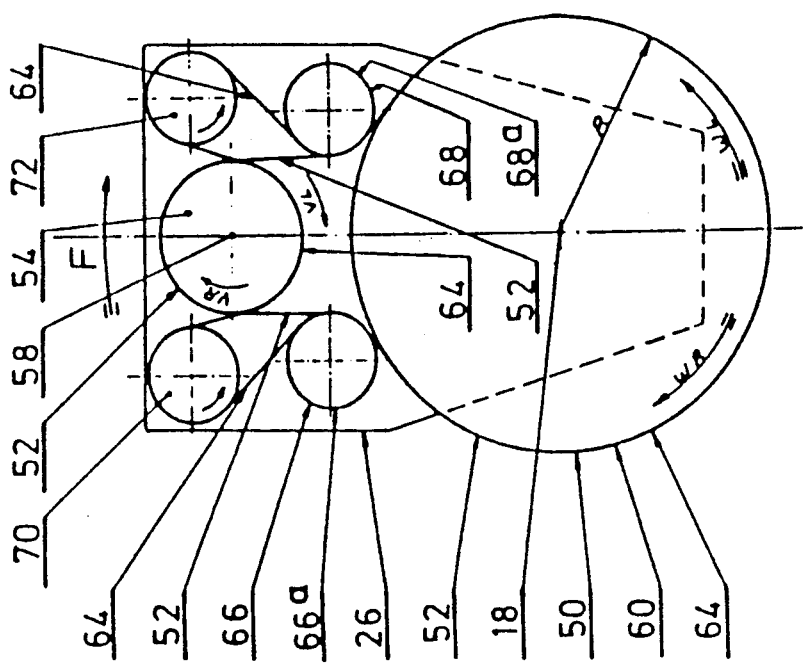
FIG.1
FIG.2

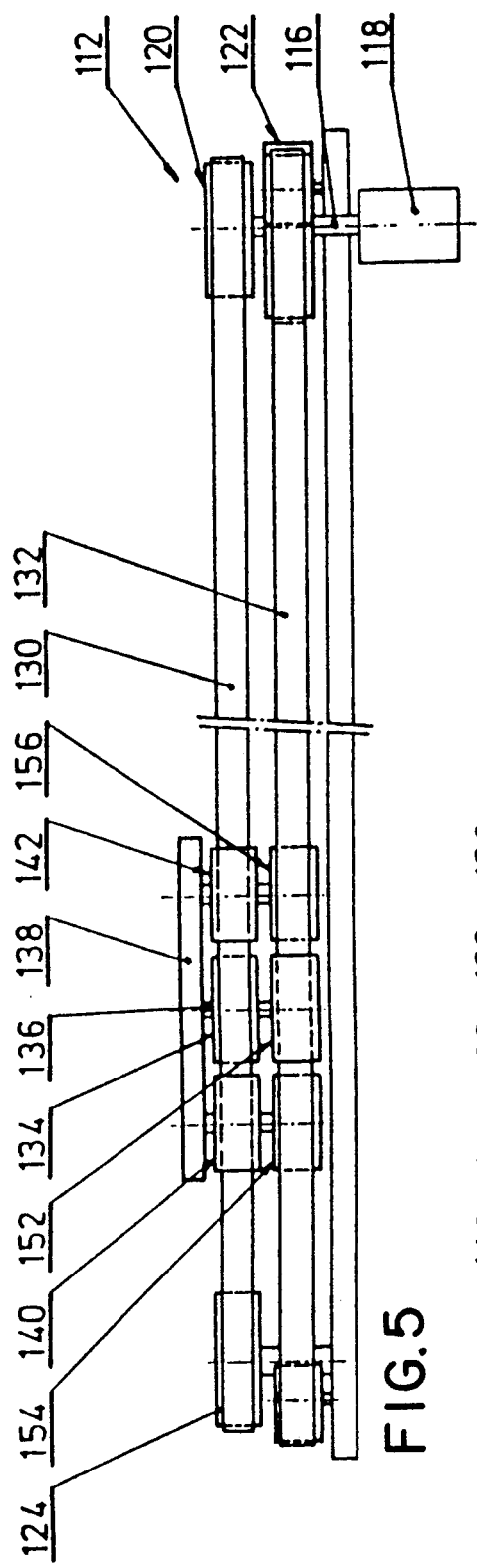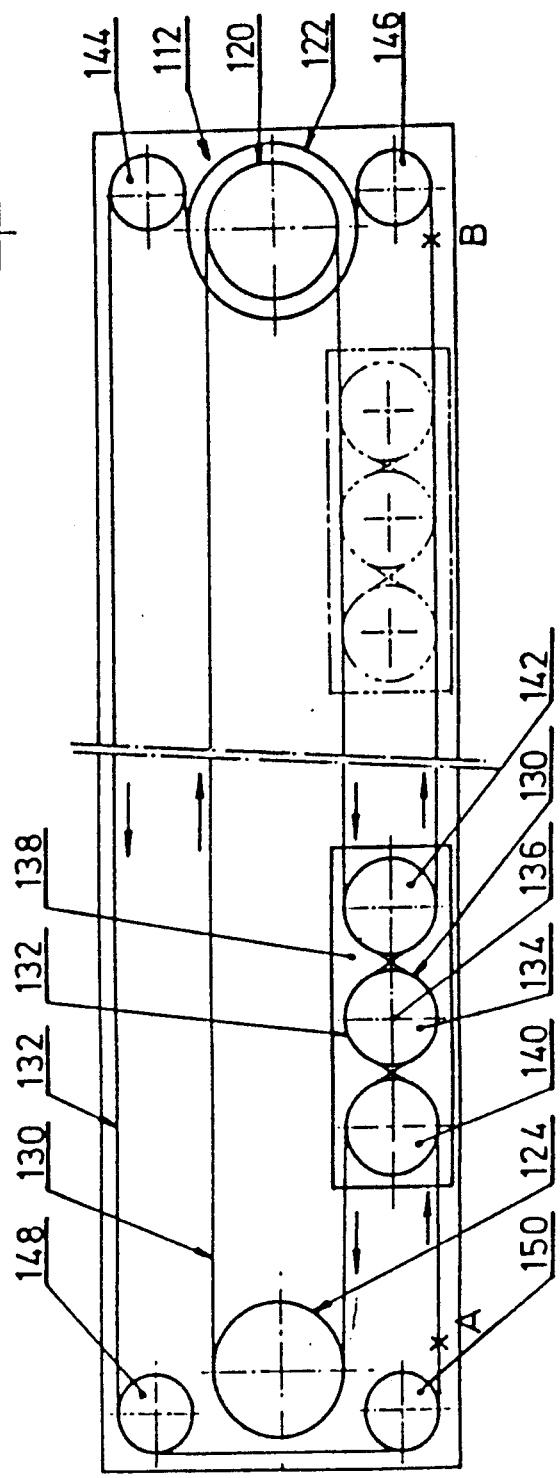

MOTION TRANSFORMING DEVICE, AND IN PARTICULAR A SPEED REDUCTION GEAR

This is a divisional of copending application Ser. No. 07/121,231, filed Nov. 16, 1987 now U.S. Pat. No. 4,896,566.

The present invention relates to a motion transforming device capable of constituting, in particular, a speed reduction gear.

BACKGROUND OF THE INVENTION

Devices for transforming a first rotary motion into a secondary motion (which is generally a further rotary motion, but which may be a rectilinear motion) are known.

When both motions are rotary motions, the device includes two shafts about which the said two rotary motions take place, with the device acting to modify the ration of the angular speeds of said rotations.

Very often, the two rotary shafts in such a device run along a common axis. The speed reducer can then be mounted directly on the output shaft from a motor, with the motor output shaft constituting the high speed shaft. The slow shaft then lies on the same axis as the motor shaft.

Such prior art devices are generally reversible, that is to say that they can also be used to increase a speed.

Such devices have numerous uses, for example in robotics, in machine tool control, etc., where they are generally used as speed reduction gears.

Of the various types of motion-transforming device of this nature, specific mention may be made, for example, of gear train devices, and in particular of devices of the epicyclic type, or else devices having eccentric drive.

A particular drawback of these known devices lies in the backlash they introduce which makes them difficult to use for precision mechanisms.

Devices are also known comprising an elliptical bearing in which a flexible ring having external teeth is deformed, said ring driving a rigid ring having internal teeth. Such devices introduce a degree of elasticity which reduces performance and may give rise to changes in motion, in particular if there are major changes in torque.

Finally, all of these devices suffer from a common drawback of operating only at a relatively low inlet speed, and of giving rise to friction which reduces overall efficiency as well as requiring the use of a lubricant. Another, additional drawback lies in added inertia about the high speed axis.

Motion transforming devices are known comprising: a first stage with two moving members, at least one of which is operationally coupled to a shaft generating a first motion which is a rotary motion; a second stage comprising at least one set of two pulleys constrained to rotate together and co-operating with transmission means, for example with two endless drive strands which co-operate with the moving members of the first stage; and a moving support which supports the two pulleys of the second stage so that they are free to rotate and whose displacement along an imposed trajectory generates a second motion.

In known devices of this type, the moving support is coupled to the high speed shaft and this suffers from the drawback of generating friction and inertia on said shaft.

One of the aims of the present invention is to provide a motion transforming device which provides advantages over prior art devices.

Another aim of the invention is to provide such a motion transforming device which can be used, in particular, as a speed reduction gear.

Another aim of the invention is to provide such a device suitable for transforming a rotary motion into another rotary motion, or else into a displacement motion along a non-circular curved trajectory which may be planar or otherwise, and vice versa.

SUMMARY OF THE INVENTION

A motion transforming device according to the present invention is of the type comprising a first stage, a second stage, and a moving support, as defined above.

It is essentially characterized by the fact that a high speed input motion to the first stage through the second stage is converted to a slow motion generated by the moving support. The two moving members of the first stage are displaced at speeds, one of which may be zero, giving a speed ratio. This ratio is different from the ratio that would be obtained by blocking the trajectory of the support, permitting free movement of the first stage other than guidance, and causing movement of the first stage other than guidance, and causing movement of the first stage by moving the second stage.

In a preferred embodiment of the invention, the transmission means are drive strands, for example endless strands, and the two moving members of the first stage are displaced in opposite directions.

It is thus the difference between two speeds of the moving members of the first stage which give rise to the displacement of the moving support, which support supports both of the second stage pulleys, and with said displacement taking place along an imposed trajectory.

This trajectory may either be a circular trajectory, in which case the second motion is a further rotary motion, or else it may be some other curved trajectory, which may be planar or non-planar, with the moving support then generating limited stroke motion along said trajectory.

In a first embodiment of the invention, the two moving members of the first stage are two coaxial pulleys, at least one of which is coupled to rotate with the shaft generating said first rotary motion, with the moving support generating rotary motion about a shaft which is coaxial with the pulleys of the first stage, and said rotary motion constituting the above-specified second motion, and the transmission means comprise two endless drive strands each co-operating with one of the pulleys of the first stage and with one of the pulleys of the second stage.

In a variant, the pulleys of the first stage may be linked with the pulleys of the second stage by transmission means which are at least partially constituted by gear wheels or by friction wheels. This serves to reduce the elasticity of the drive strands and also to reduce the size of the device. For example, combined transmission means may be devised including both a drive strand and also gear wheels or friction wheels.

When at least one of the transmission means is constituted by ear wheels or friction wheels, this transmission means co-operates with a member of the first stage which may have an external contact surface or teeth, or else an internal contact surface or teeth.

Under some conditions, it is possible to cause the moving support to rotate by motorizing one of the moving members of the first stage (with the other one being prevented from rotating), even if these members of the first stage do not rotate in opposite directions, with the members of the first stage being considered as being released from any constraint other than guidance and being driven by the second stage with the moving support being blocked on its trajectory. However when used in this way, the composition of the speeds between the moving support and the drive member of the first stage reduces the reduction ratio which would obtain solely from the relative values of the diameters of the various pulleys or wheels constituting the device.

This reasoning remains unchanged if both members of the first stage are motorized, providing this reasoning is applied to the speed differential between these two members of the first stage.

The moving support of the device in accordance with the invention may be constituted by an arm keyed to a shaft which generates said second motion, with the set of second stage pulleys then being carried by said arm and describing a circular trajectory about the shaft to which said arm is keyed.

In a variant, the moving support is constituted by a plate keyed to a shaft which generates the second motion, said plate supporting a predetermined number of pulley assemblies of the second stage, with each length of drive strand passing alternately around a peripheral region of a first stage pulley and around a pulley of the second stage.

In another embodiment of the invention, the two moving members of the first stage are constituted by two drive strands having portions which are parallel and coplanar, with at least one of them being coupled to the shaft generating the first motion; and the moving support generates a limited stroke displacement motion over a non-closed trajectory, for example a rectilinear trajectory, thereby constituting the second motion.

Advantageously, the two drive strands co-operate with a set of two coaxial pulleys coupled to the shaft generating the first motion and the moving support with a carriage displaceable along a guide path or template, said carriage supporting the set of second stage pulleys.

As mentioned above, the transmission means of a device in accordance with the invention are not limited to being endless drive strands. However, when such drive strands are used, they may be constituted, for example, by flexible strands such as toothed belts, flat belts, V-section belts, cables, cords, strips, etc., or they may be hinged strands such as chains.

In an embodiment of the invention which is preferred but which is not limiting, the pulleys are toothed pulleys and the drive strands are toothed belts.

In another embodiment, the invention also relates to a motion transforming device, and in particular a speed reducer, in which one of the members of the first stage is prevented from rotating and also constitutes an element (for example a sun element) of a second differential speed reducing device. The moving support also constitutes the satellite-carrier of said second device with the second stage(s) optionally constituting the satellite(s) of said second device.

The high speed shaft is constituted, in this case, by the moving member (i.e. the member which is not blocked) of the first stage of the device in accordance with the invention, while the slow shaft is constituted by one of the non-blocked shafts—for example the sun shaft—of the second differential device.

This second differential device which is of a type known per se may use gear transmission, belt transmission, or some other form of transmission. It may also use a plurality of said known means in a single equipment.

A "bi-differential" type of speed reducer is thus obtained in accordance with the invention.

Advantageously, the pulleys of the first stage are linked to the pulleys of the second stage by endless drive strands constituted by toothed belts, with at least one of the toothed belts being advantageously toothed on both faces, and the pulleys of the first stage and the pulleys of the second stage being toothed wheels with the toothed pulley also running round the return pulleys which are constituted by toothed wheels.

BRIEF DESCRIPTION OF THE DRAWINGS

Embodiments of the invention are described by way of example with reference to the accompanying drawings, in which:

FIG. 1 is a fragmentary section through a motion transforming device in accordance with the invention;

FIG. 2 is a schematic representation of a device according to the invention;

FIG. 4 is a plan view of another motion transforming device in accordance with the invention;

FIG. 5 is a side view of the device shown in FIG. 3; and

DESCRIPTION OF THE PREFERRED EMBODIMENTS

Figure 3:
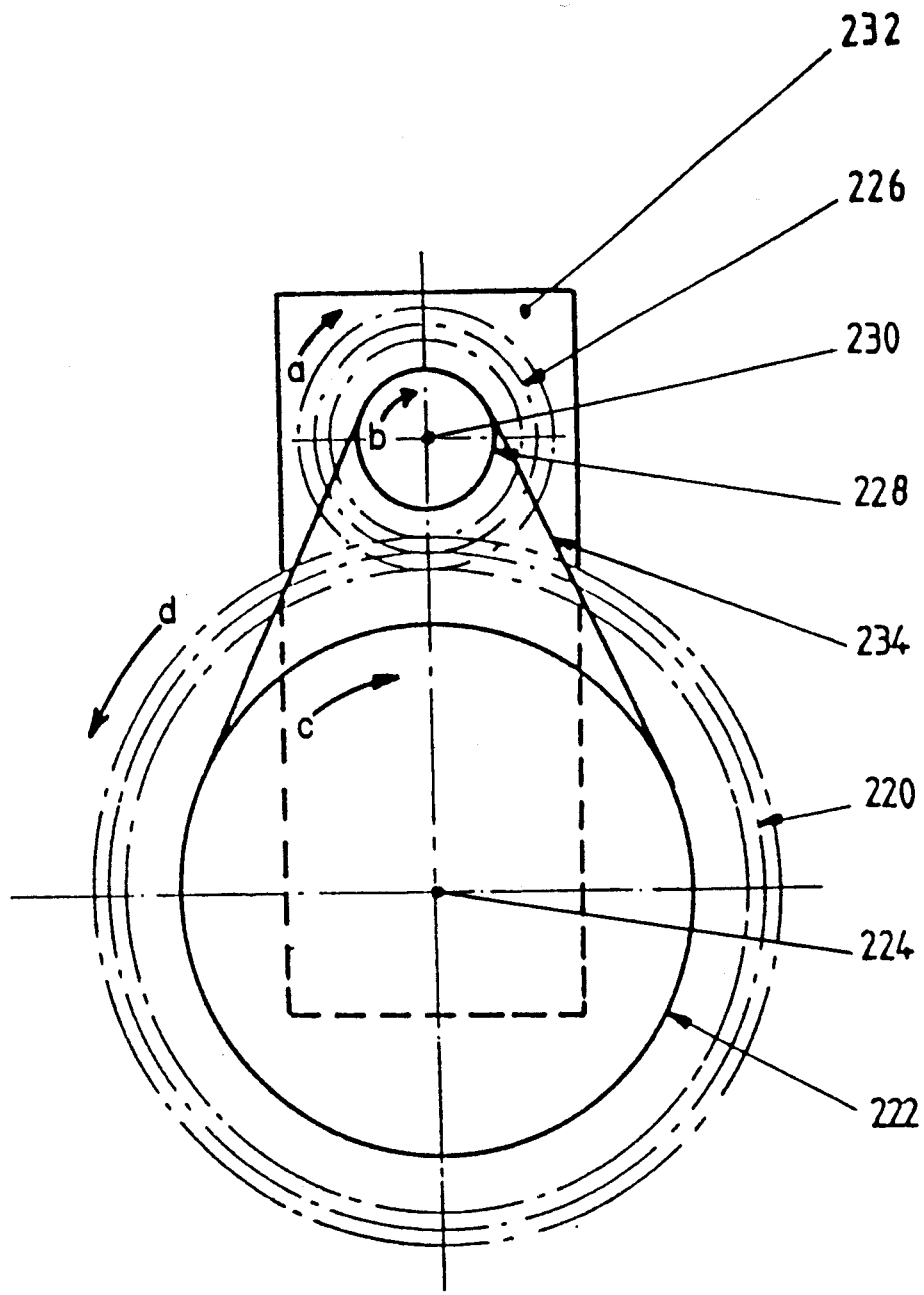
FIG. 3 is a modification of the device shown in FIGS. 1 and 2.

Reference is made initially to the device shown in FIGS. 1 and 3. This device comprises a two-part, generally cylindrical housing comprising a first or housing part 10 constituted by a plane end wall 12 and a cylindrical side wall 14, and a second or closure part 16 constituted by a plane wall whose peripheral edge may be fixed to the cylindrical wall 14 by any appropriate means. The housing as a whole is generally cylindrical in shape about an axis 18. The annular wall 12 has a cylindrical extension 20 centered on the axis 18 and provided on the inside with ball bearings 22 which co-operate with a hub 24 having an arm 26 projecting therefrom for rotating inside the housing about the axis 18. The hub 24 comprises an annular cylindrical wall 28 from which the arm 26 projects, and an end wall 30 from which there extends a shaft 32 in alignment with the axis 18.

Ball bearings 34 are disposed inside the hollow hub 24 in order to co-operate with one end of a hollow shaft 36 whose other end co-operates with ball bearings 38 disposed in a cylindrical bearing surface 40 provided through the wall 16. The wall 16 also defines a generally cylindrical housing 42 to which one end of a motor 44 may be mounted in a position which is offset relative to the axis 18. The motor 44 includes an outlet shaft 46 which runs along an axis 48 extending parallel to the axis 18. The shaft 46 is intended to be connected to drive means associated with the motion transforming device. In a variant embodiment, the motor 44 could be placed in a disposition which is coaxial about the axis 18.

A pulley 50 is keyed to the shaft 36 in the immediate proximity of the arm 26. In the present example, the pulley 50 is a toothed wheel. An endless strand 52, and in the present example a toothed belt, passes round the pulley 50 and also round another pulley 54 which is mounted to idle on ball bearings 56 about a pivot post 58 mounted on the free end of the arm 26 and extending parallel to the axis 18. Another pulley 60, likewise in the form of a toothed wheel and having the same diameter as the pulley 50 but extending over twice its axial extend, is mounted to rotate freely about the shaft 36 by means of ball bearings 62 and it is located adjacent to the pulley 50. As described below, the pulleys 50 and 60 are intended to be rotated at different speeds (one of which may be zero), and in opposite directions.

A drive strand 64 passes round the pulley 60. Unlike the belt 52 which has teeth solely on its inside face, the drive strand 64 is a belt which has teeth on both faces.

As can be seen in FIGS. 1 and 3, the belts 52 and 64 pass round respective peripherally opposite regions of the pulley 54 which is a double pulley of sufficient axial extent to co-operate with both of the belts 52 and 64.

As can be seen in FIG. 3, the belt 52 runs around more than three-fourths of the periphery of the pulley 50, then around a tensioning wheel 66 mounted to rotate freely on the arm 26, then around the external peripheral region of the pulley 54, and then around the back of another tensioning wheel 68 also mounted on the arm 26 prior to returning to the periphery of the pulley 50. The wheels 66 and 68 are disposed in such a manner as to be practically tangential to the periphery of the pulley 50 in order to reduce the length of the strands under tension, and consequently reduce the resilience and thus improve the winding of the strand 52 around the pulley 50.

The strand 64 also runs round more than three-fourths of the periphery of the pulley 60, and then passes around a tensioning wheel 66a which is coaxial with the wheel 66, then around another tensioning wheel 70 likewise carried by the arm 26, then around the double pulley 54, but around the inside face thereof rather than the outside face, then around another tensioning wheel 72 likewise carried by the arm 26, and finally around a tensioning wheel 68a which is coaxial with the wheel 68, prior to returning to the periphery of the pulley 60.

In this example, the pulley 50 is driven at an angular speed which is greater than that of the pulley 60 and which is in the opposite direction. As a result, the strand 52 is driven at a linear speed which is greater than the linear speed of the strand 64.

Since the strands 52 and 64 co-operate with the same double pulley 54 and without sliding, their linear speeds on this double pulley must be equal, and as a result the arm 26 will perform rotary motion suitable for ensuring that said linear speeds are indeed equal. If variables are designated as follows:

$V_R$ equals the linear speed of the strand 52 about the pulley 54;

$V_L$ equals the linear speed of the strand 64 about the pulley 54;

$W_R$ equals the angular speed of the pulley 50;

$W_L$ is the angular speed of the pulley 60;

$W_S$ is the angular speed of the arm 26; and

R is the radius of the pulleys 50 and 60; then the following equations may be written:

$$V_L = W_L R + W_S R$$

$$V_R = W_R R - W_S R$$

$$V_L = V_R$$

whence:

$$W_S = (W_R - W_L)/2.$$

This gives the reduction ratio of the device shown in FIGS. 1, and 3, with the direction of rotation of the arm 26 being indicated by an arrow F in FIG. 3. With the speeds shown in FIG. 3, both the direction of $W_S$ and the directions of the rotary couples about the axis 18 as applied to the arm 26 by the strands under tension of the belts 52 and 64 satisfy the above-defined speed relationship.

This system also operates as a speed multiplier, since if the arm 26 is rotated, then the pulleys 50 and 60 rotate at higher speeds.

Also, the secondary motion is a relative speed, i.e. in the embodiment shown in FIGS. 1 and 3, if the arm 26 is stopped, then the speed $W_S$ is superposed on the speeds $W_R$ and $W_L$ of the pulleys 50 and 60. This is manifested by the part 16 rotating continuously about the axis 18 of FIG. 1.

Naturally, if the directions of rotation of each of the pulleys 50 and 60 is reversed, then the arm 26 rotates in the opposite direction to that shown by arrow F.

It will be understood that in the language of the claims, the pulleys 50 and 60 constitute the moving members of the "first" stage, while the double pulley 54 constitutes the entire set of pulleys of the "second" stage.

In the example, the pulleys 50 and 60 have the same diameter and the pulley 54 is of double width in the axial direction and of constant diameter. In a variant embodiment, the pulleys 50 and 60 could be of different diameters and the double pulley 54 could be constituted by two pulleys of different diameters but constrained to rotate together.

The pulleys 50 and 60 are driven by means of the shaft 46 of the motor 44 having a stepped shaft 74 keyed thereto and co-operating with ball bearings 76 inside the housing 42. The end of the shaft 74 is keyed to a double-sized pulley 78 having two belts disposed thereabout: a belt 80 having teeth on one face only, and a belt 82 having teeth both faces. The belt 80 co-operates with a pulley 84 which is likewise in the form of a toothed wheel and which is keyed to the shaft 36, while the belt 82 co-operates with the pulley 60 via its external toothed face.

It will be understood that the pulleys 60 and 84 are driven at different speeds of rotation in opposite directions under the action of the motor 44 and the above-described drive means, with the pulley 84 being driven at the slow angular speed $W_L$ and with the pulley 60 being driven at the high angular speed $W_R$.

When the motor 44 is set in motion, the arm 26 and consequently the shaft 32 are also rotated at angular speed $W_S$, which id slower than the speed of the motor.

In a variant, one of the pulleys 50 and 60 may be prevented from rotating, so that only the other one of them is driven by the motor. Thus, the shaft 36 can be prevented from rotating and the belt 80 may be omitted. In this case the pulley 50 is also prevented from rotating and only the pulley 60 is driven by the motor.

In order to ensure that the device shown in FIGS. 1 and 3 is capable of operating, it is essential for the pulleys 50 and 60 of the first stage to be displaced at relative speeds such that the ration of these speeds is different from the ratio of speeds obtained when the arm 26 is stopped on its trajectory, and also for these two moving members to be free to rotate in opposite directions by virtue of the double pulley 54 rotation. If this is not true, then the arm 26 is not rotated.

The disposition of strands 52 and 64 as shown in FIGS. 1 and 3 is given purely by way of example. Other dispositions are possible, provided the pulleys 50 and 60 rotate in opposite directions and provided the two parts of the double pulley 54 rotate in the same direction.

It is also possible using a single stage of pulleys 50 and 60 to provide a system having at least two arms 26 rotating at speeds whose values and directions may differ from one another. This is possible simply by varying the different diameters of the pulleys 54. It should be noted that in this case the motions of these two arms 26 are limited in amplitude.

According to the device of the present invention, reference is now made to FIG. 3 in which the motion transforming device comprises a first stage comprising two coaxial pulleys 220 and 222, one of which, in this example pulley 222 is rotatably coupled to a shaft 224 generating a first rotary action. Driving means (not shown) are coupled to the shaft 224 and to the pulley 222 to achieve driving of the two pulleys 220 and 222.

Pulleys 226 and 228 joined together to rotate in unison around shaft 230 secured to movable arm 232 comprise a second stage.

The pulleys 220 and 226 consist of toothed wheels which directly mesh together. By contrast, pulleys 222 and 228 are operationally coupled together through the intermediary of a strand 234 which may be a flexible strand such as a toothed belt, a flat belt, a V-section belt, a cable, a cord, a strip, and so forth, etc., or a hinged strand such as a chain. According to a preferred embodiment, the strand 234 is a toothed belt and pulleys 222 and 228 are suitable toothed wheels.

In operation, the device shown in FIG. 3, in order that the movable support 232 may be rotatably displaced, the first stage pulleys 220 and 222 have to be displaced at respective speeds having a ratio different from the speed ratio obtained when the movable support 232 is blocked on its trajectory and when the two movable pulleys 220 and 222 are displaced without any constraints other than guidance, while being driving by the rotation of the second stage pulleys.

It can be seen from FIG. 3 that toothed pulley 222 driven by shaft 24 drives toothed pulley 228 around shaft 230 staked to movable arm 232 by means of a strand drive 234. The operation here is similar to the drive shown in FIGS. 1 and 2 wherein toothed pulley 50 driven by shaft 36 drives toothed pulley 54 around shaft 58 staked to movable arm 26 by means of strand drive 52. The principal difference between FIG. 3 and FIGS. 1 and 2 lies in the substitution in FIG. 3 of the directly meshing gears 20 and 226 for the drive 60, 54 (extended) and belt 64. The arrows a, b, c and d show the rotation of gear 226, pulley 228, pulley 222 and gear 220, respectively.

Reference is now made to FIGS. 4 and 5 which show a different embodiment of a motion transforming device in accordance with the invention. This device comprises a set 112 of two coaxial pulleys coupled to the shaft 116 of a motor 18 which generates the first motion of the device. In this example, the pulleys 120 and 122 are preferably toothed wheels which co-operate with drive strands 130 and 132 constituted by belts having teeth on one face only, with these drive strands constituting the moving members of the "first stage" of the invention.

The strand 130 is an endless strand passing round the pulley 120, round another pulley 124 situated at a distance from the pulley 120, and round a pulley 134 mounted free to rotate about a shaft 136 carried by carriage 138 constituting a moving support displaceable along a guide path (not shown) running parallel to the general direction of the strand 130. This guide path is shorter than the distance between the axes of the pulleys 120 and 124. Tensioning wheels 140 and 142 are carried by the carriage 138 and are intended to ensure that the strand turns round substantially one-half of the circumference of the pulley 134. The wheels 140 and 142 are of substantially the same diameter as the pulley 134 and they are situated on opposite sides thereof, with the axes of the wheels 140 and 142 being parallel and coplanar with the axis 136.

The strand 132 passes round the pulley 122 but round a region thereof which is opposite to the region where the strand 130 passes round the pulley 120. As a result the strands 130 and 132 are driven at linear speeds which are different and in opposite directions, as shown by arrows in FIG. 4. Wheels 144 and 146 ensure that the strand 132 runs around the pulley 122 and tensioning wheels 148 and 150 ensure that the strand 132 runs round a region close to the pulley 124. The strand 132 passes round a pulley 152 which is constrained to rotate together with the pulley 134, with the pulley 152 being mounted on the same shaft and having the same diameter as the pulley 134. As shown in FIGS. 4 and 5, the strand 132 passes round a peripheral region of the pulley 152 which is on the opposite side of the axis 136 to the peripheral region of the pulley 134 around which the strand 130 passes. The strand 132 is wound round the pulley 152 by tensioning wheels 154 and 156 which are coaxial with the wheels 140 and 142 respectively.

In a variant embodiment, not shown, the pulleys 120 and 122 of the assembly 112 could have the same diameter and the pulleys 134 and 152 could have different diameters.

The device shown in FIGS. 4 and 5 operates as follows. With the shaft 116 being rotated by the motor 118, the pulleys 120 and 122 are also rotated and as a result the strands 130 and 132 move at linear speeds which are different and in opposite directions. These strands cause the carriage 138 to move linearly along its guide path. In this embodiment, the motor cannot run continuously and so it alternates between one direction and the other in order to cause the carriage 138 to move back and forth along its guide path, which is naturally of limited extent. Feelers may be provided at the ends of the guide path to automatically reverse the direction of motor operation when actuated so as to cause the carriage 138 to reverse. The speed of carriage displacement is set in particular by the speed of motor rotation, and it should be observed that the closer the diameters of the pulleys 120 and 122, the slower the speed of carriage displacement. It can be shown by calculation that in the present embodiment the linear speed of the carriage is equal to one-half of the difference between the linear speeds of the strands 130 and 132.

In addition, it should be observed that the device shown in FIGS. 4 and 5 is reversible. If the carriage is displaced along its guide path, than the shaft 116 of the motor is caused to rotate.

In a variant embodiment, one of the strands 130 and 132, for example the strand 132, may be held stationary so that its speed is zero. This may be simply achieved by fixing the strand 132 to the frame of the device, as represented in FIG. 4 at points A and B. As a result the non-moving portion of the strand 132 between A and B may be omitted.

In another variant of the motorization of the strands 130 and 132, instead of the motorization being provided by the pulleys 120 and 122 it is provided by at least one of the tensioning wheels, for example the wheels 144 and 146.

It should be observed that the device shown in FIGS. 4 and 5 may be used, where applicable, to drive a carriage analogous to the carriage 138 by means of the other two parallel portions of the strands 130 and 132.

In general, it si possible to mount one or more carriages on the go and return strands 130 and 132, said carriages being capable of displacement at different speeds, and even in different directions.

In all of the above-mentioned embodiments, the moving support capable of being displaced along an imposed trajectory may directly constitute a member that is to be moved. Thus, the arm of the device shown in FIGS. 1 and 3 may directly constitute a member to be drive, for example, the arm of a robot.

Figure 6:
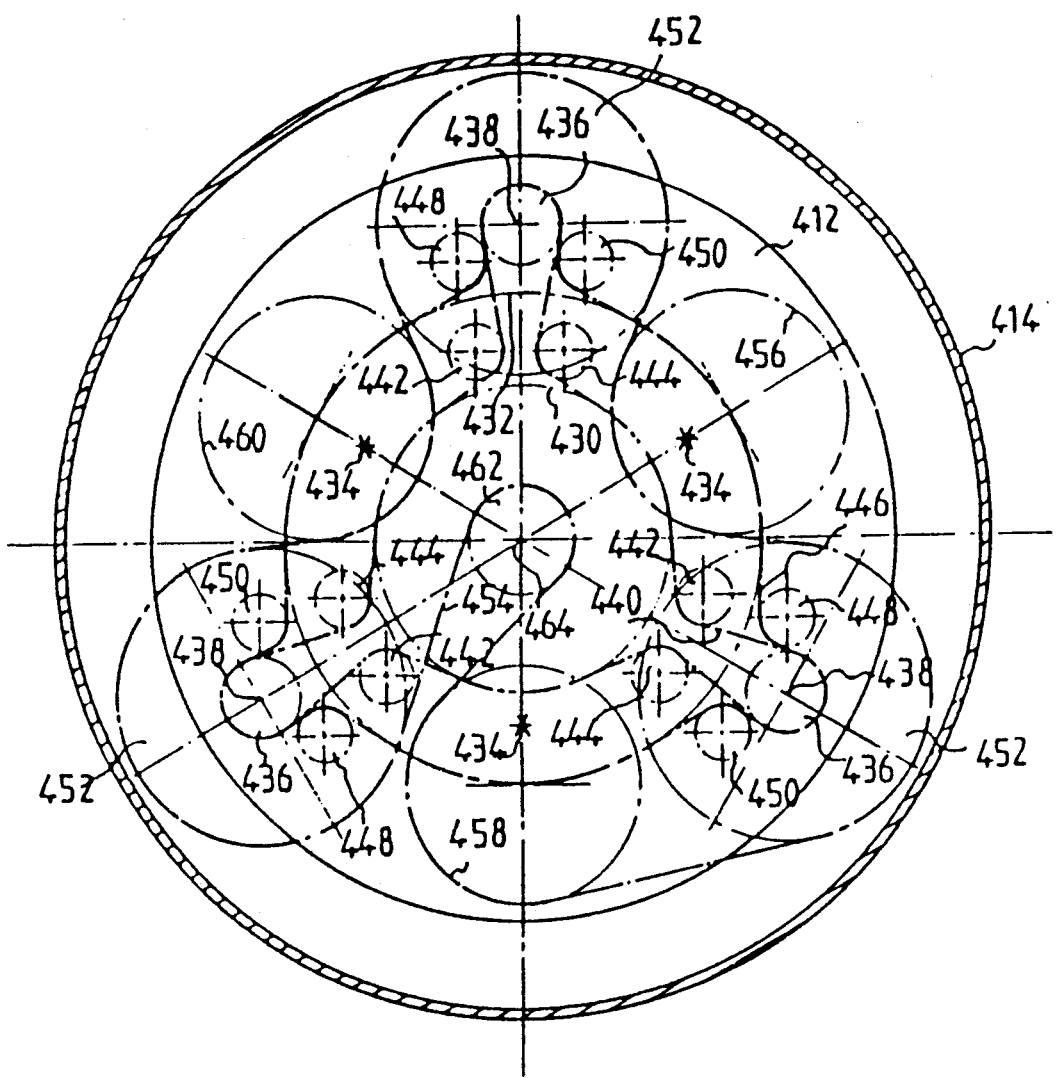
FIG. 6 is a diagram of another motion transforming device in accordance with the invention.

Reference is now made to FIG. 6 which shows another motion transforming device suitable for constituting a "bi-differential" speed reducing device.

The FIG. 6 device includes a first stage comprising two coaxial pulleys 462 and 432. The smaller diameter pulley 462 is coupled to a shaft 464 (not shown) which constitutes one of the two rotary shafts of the device. The pulley 432 is constrained to rotate with the frame 414 by means of three fixing members 434.

The device further includes a second stage comprising three assemblies each constituted by two coaxial pulleys 436 and 452 which are constrained to rotate together and which are mounted to rotate freely on a shaft 438 running parallel to the axes of the pulleys 462 and 432. The three sets of pulleys 436 and 452 are spaced at equal distances and angles about the axes of the pulleys 462 and 432 of the first stage. The shafts 438 are carried on a moving support 412.

The device includes an endless drive belt 446 which provides transmission between the pulley 432 of the first stage and the three pulleys 436 of the second stage. Two deflector wheels 448 and 450 are mounted to rotate freely on shafts carried by the moving support in the immediate proximity of each of the three sets of pulleys of the second stage. This is intended to facilitate winding the strand 446 around the pulley 432 and around the three pulleys 436. Thus, the strand 446 passes successively around a first pulley 436, around a portion of the pulley 432, around a second pulley 436, around a second portion of the pulley 432, around a third pulley 436, and around a third portion of the pulley 432 before returning to the first above-mentioned pulley 436, with the strand 446 being guided each time by three pairs of deflector wheels 448 and 450.

A strand 454 winds successively around the pulley 462, one of the pulleys 452, a deflector pulley 460, a second pulley 452, a deflector pulley 456, a third pulley 452, a deflector pulley 458, and then returns to the pulley 462.

The strand 454 is a double-sided toothed belt and the pulley 462, the three pulleys 452 of the second stage, and the three deflector pulleys 456, 458, and 460 are all toothed wheels with teeth to match the teeth of the belt. As can be seen in FIG. 5, the deflector pulleys 456, 458, and 460 are of as large a diameter as possible, so that the space lying between a deflector pulley and a pulley 452 is as small as possible. In this manner, the lengths of the portions of the belts 454 under tension, i.e. the lengths of the portions of said belt which are not wound around a pulley are kept as short as possible. This serves to reduce the elasticity due to the toothed belt since this elasticity cannot act on those portions of the belt which are wound around a pulley, be that the pulley 462, one of the pulleys 452, or one of the deflector pulleys 456, 458, and 460.

In a manner corresponding to the strand 446, an endless strand 440 provides motion transmission between the pulleys 436 (which are constituted by pairs of pulleys) and the pulley 430 which corresponds to the second axis of rotation of the device. The assembly constituted by the pulleys 430, 432, and 436 forms the second differential device which col-operates with the differential device of the invention, which is itself constituted in this example by the set of pulleys 432, 436, 452, and 462.

The strand 440 is wound around the pulley 430 and the three pulleys 436 in substantially the same manner as the strand 446 is round around the pulley 432 and the three pulleys 436. Winding of the strand 440 is facilitated by deflector wheels 442 and 444.

The FIG. 6 device operates as follows: when the pulley 462 is driven to rotate about its axis 462 (the high speed shaft), the assembly constituted by the pulleys 462, 436, 452, and 432 causes the moving support 412 to rotate. This corresponds to a special case of the invention in which the speed of one of the members of the first stage is zero.

The second differential device constituted by the pulleys 430, 432, and 436 as driven by the moving support 412 generates a slow rotation on the pulley 430. A speed reducing device is thus obtained having two differential stages.

Naturally, this assumes that the step-down ratio of the slow stage is other than infinite.

In the various embodiments of the invention it is possible to make use of transmission means constituted at least in part by gear wheels or by friction wheels, in order to replace the drive strands, as mentioned above. further, when a second differential device is used in order to form a "bi-differential" type of device, the second device may be of any known configuration.

I claim:

1. A device for transforming notion and, in particular, a speed-reducing device comprising:
    a rotatably fixed housing;
    a high speed input means to a first stage, said input means being supported by said housing;
    said first stage comprising two members;
    at least one of said two first-stage members being operationally coupled to said input means for generating a first rotary motion;
    the other of said two first-state members having a speed which may be zero with respect to said housing;
    a second stage pulley-gear means comprising at least one pulley and one tooth gear means rotating together and operationally coupled to each of said two first-stage members;
    one of said first-stage members being a pulley which is coupled to the pulley of said second stage by a strand, and the other of said two first-stage members being a tooth gear directly meshing with the gear of the second stage;

a movable support supported by said housing and mounting said pulley-gear means so that said pulley-gear means is free to rotate relative to said movable support and to move in an imposed trajectory relative to said housing, the movement of said pulley-gear means along said imposed trajectory generating a low speed output through said movable support;

said strand running such between said first stage and said second stage that said strand generates a first rotary couple on said movable support, and said gears cooperating such that said gears generate a second rotary couple on said movable support which is in the same direction as the first rotary couple to cause movement of said movable support for generating a second rotary motion.

* * * * *